United States Patent [19]
Herbert et al.

[11] Patent Number: 4,548,568
[45] Date of Patent: Oct. 22, 1985

[54] EXTRUSION HEAD

[75] Inventors: Adolf Herbert; Dietmar Anders, both of Hanover; Günter Meier, Ahlem, all of Fed. Rep. of Germany

[73] Assignee: Hermann Berstorff Maschinenbau GmbH, Fed. Rep. of Germany

[21] Appl. No.: 525,709

[22] Filed: Aug. 23, 1983

[30] Foreign Application Priority Data

Oct. 15, 1982 [DE] Fed. Rep. of Germany ....... 3238284

[51] Int. Cl.⁴ ............................................... B29F 3/04
[52] U.S. Cl. .................................. 425/131.1; 425/185; 425/188; 425/462; 425/466
[58] Field of Search ..................... 425/131.1, 185, 188, 425/462, 466

[56] References Cited

U.S. PATENT DOCUMENTS

| | | |
|---|---|---|
| 3,486,195 | 12/1969 | Greenwood et al. |
| 3,902,835 | 9/1975 | Theysohn ............................ 425/188 |
| 4,137,027 | 1/1979 | Ruger ................................. 425/462 |
| 4,405,547 | 9/1983 | Koch et al. .......................... 425/462 |

*Primary Examiner*—Jay H. Woo
*Assistant Examiner*—Timothy W. Heitbrink
*Attorney, Agent, or Firm*—Schwartz, Jeffery, Schwaab, Mack, Blumenthal & Evans

[57] ABSTRACT

An extrusion head for producing flat profiles such as tread strips for automotive vehicles from three or more different rubber or plastics materials is disclosed. The head comprises a fixed central portion and upper and lower portions pivotally connected thereto, and is fed with the different mixtures by a plurality of screw or worm extrusion devices. Between the upper and central portion and the central and lower portions of the head, insert members are located. In the upper and/or lower surface of each insert member, flow channels for the mixtures are defined, the flow channels each being bounded upwardly or downwardly as appropriate, by a plane surface of one of the portions of the head. The insert members are axially divided and are made in one piece. The flow channels each have a longitudinal axis of symmetry and such axes lie in a common vertical plane. Such an arrangement permits the profile to be changed merely by replacing one or both insert members, permits the worms or screws to be readily removed for cleaning purposes and also ensures that the flow rates in each of the flow channels is substantially constant, thereby avoiding problems of pre-vulcanization.

1 Claim, 9 Drawing Figures

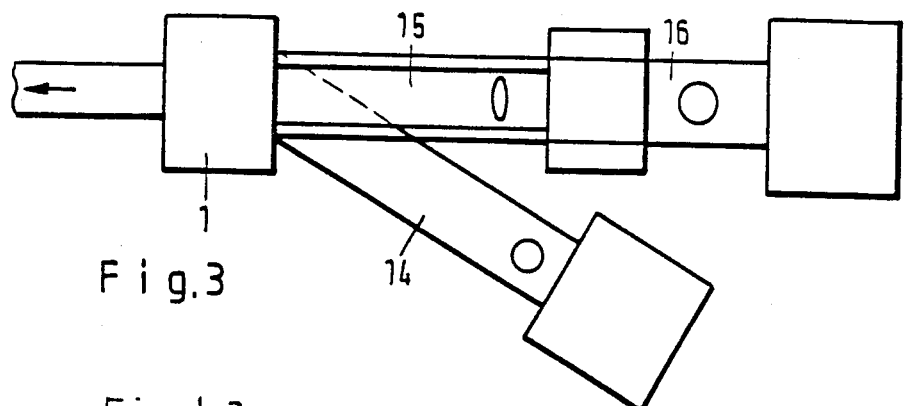
Fig. 3
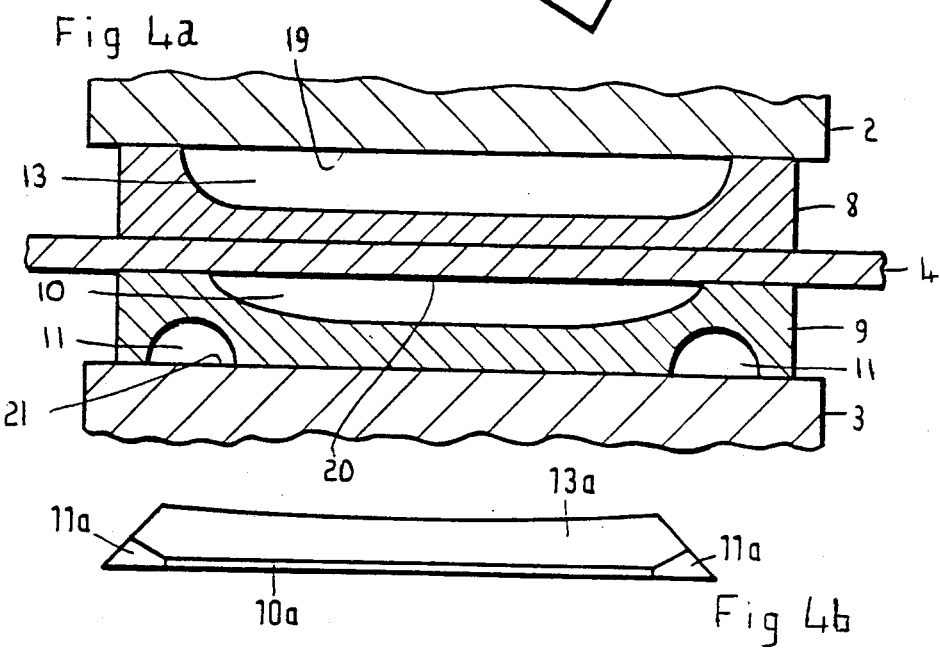
Fig 4a
Fig 4b
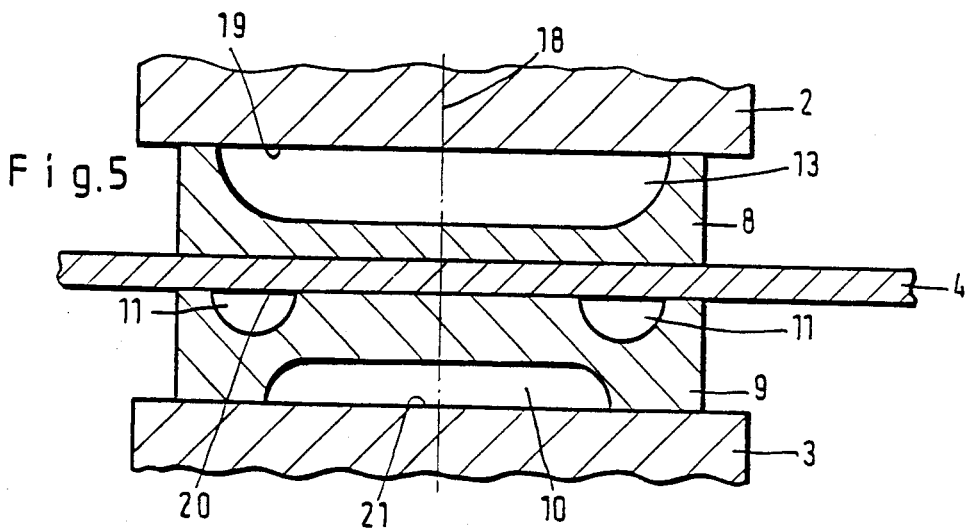
Fig. 5

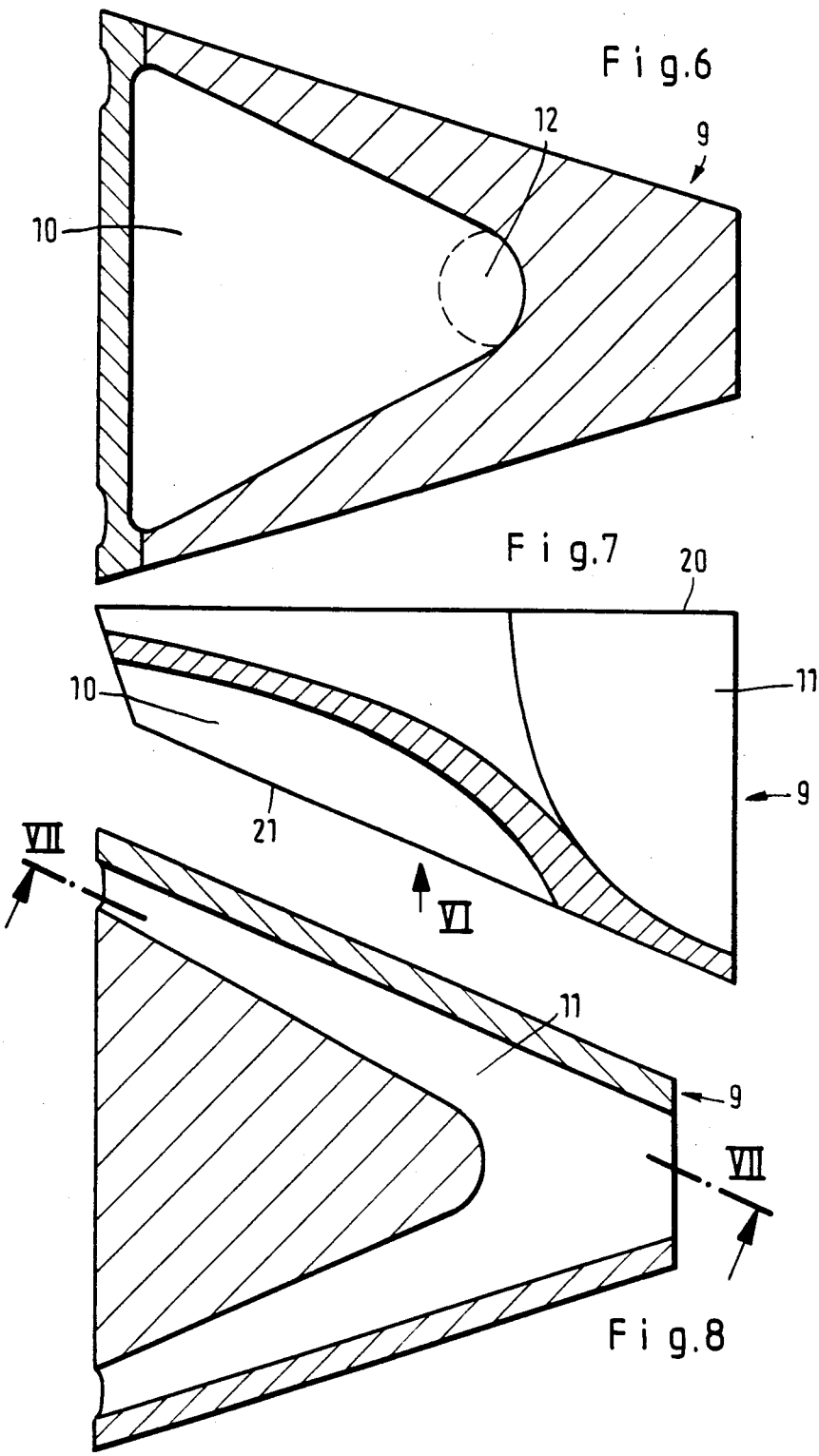

EXTRUSION HEAD

BACKGROUND OF THE INVENTION

The invention relates to an extrusion head for producing flat profiles from rubber or plastics material mixtures.

A typical example of such a flat profile is a tread strip for automobile tires. In order to produce a tread strip for tires, it is necessary for three different types of mixtures to be combined because the strip comprises a tread surface made of a highly wear-resistant material, lateral portions made of highly compressible material and a so-called lower or base portion which forms the bottom layer of the tread surface and is usually formed from a softer mixture than the tread surface.

These three mixtures have markedly different viscosities but must be brought together in a single extrusion head to form the tread strip. Moreover, the mixtures must flow in flow channels in the extrusion head at substantially identical flow rates.

DISCUSSION OF PRIOR ART

In German Offenlegungsschrift No. 2 622 011 there is disclosed an extrusion apparatus suitable for producing flat profiles from two different types of mixtures. The apparatus includes an extrusion head which is divided into two planes located one above the other. The central portion of such a head is fixedly connected to the extrusion devices, while the upper and lower portions of the head are pivotable.

It is necessary for the head to be pivotable so that the flow channels can be cleaned if the mixture flowing therethrough is to be changed. Flow channel insert members can be inserted into the extrusion head if it is desired to alter the shape of the profile being produced. Such insert members are disposed in the head and each such member comprises an upper portion and a lower portion having a parting plane which extends along the length of the channel across the horizontal diameter. To define two flow channels, therefore, four insert members, each of which defines half a flow channel, are necessary. Each of these must be unscrewed and replaced if a tread strip of a different size is to be extruded. The head illustrated in this prior specification is thus only capable of processing two different types of mixtures.

U.S. Pat. No. 3,099,359 discloses an extrusion apparatus wherein three extrusion devices extrude into one extrusion head to permit tread strips to be produced. However, despite the use of three extrusion devices, such apparatus can only be used to extrude two different types of mixtures. The tread surface is extruded by means of the central extrusion device and the lateral portions are extruded separately by laterally disposed extrusion devices. The lower or base layer used to form the tread strip, that is to say, the third mixture, is subsequently joined to the extruded tread surface and lateral portions on a doubling rolling mill. In consequence, a doubling calender is also required. Such calendering is relatively expensive and takes up additional space in the manufacturing area. The extrusion head illustrated in this prior document is not pivotable. If the mixture being used is changed and/or if the worms of the three extrusion devices need to be cleaned, the entire apparatus has to be dismantled. This is not economically viable.

Since the extrusion head must be pivotable in order to permit a cleaning operation to be effected more quickly and because of the need for the insert members to be readily interchangeable to enable the production of different-sized profiles to be achieved, the extrusion heads disclosed in these prior art documents do not provide an economic solution.

In order to permit the material utilised to form the lateral portions to be deflected to form the external surfaces, such material must traverse extremely long flow paths before it can emerge from the extrusion head. Howevere, if the mixture for forming the two lateral rubber strips or, if desired, the mixture for forming the base, is conveyed to the head by means of a fourth extrusion device, then this, according to the teaching of U.S. Pat. No. 3,099,359, would have to be disposed either to the left or right of the tread surface extrusion device. If the extrusion device is disposed, for example, on the left-hand side of the tread surface extrusion device, a very long flow channel would be required on the right-hand side. The mixture in such right-hand side channel would therefore flow more slowly, and the temperature thereof would differ from that of the mixture in the left-hand flow channel. As a consequence thereof, the different amounts of cooling of the materials would have a detrimental effect upon the combining process when the mixtures are brought together in the extrusion head.

However, an even greater danger resides in the fact that the mixture in the long right-hand flow channel may easily become partially pre-vulcanized. Consequently, during subsequent vulcanization in a tyre heating press, the tread strip would be double vulcanized in places and would therefore contain weakened portions.

OBJECTS OF THE INVENTION

The invention seeks to provide an extrusion head which is of the pivotal type disclosed in German Patentschrift No. 2 201 631, but which permits three or more different mixtures to be extruded simultaneously. In a subsidiary aspect, the present invention seeks to provide an extrusion head which permits the shape and constitution of the profile being produced to be changed rapidly.

Particular care must be taken to ensure that, despite the fact that three or more very different types of mixtures are being processed, the flow rates of the mixtures must be kept as constant as possible in all of the flow channels. This applies particularly to flow channels which may be used for forming the lateral portions of a tread strip since these emerge from the outer edges of the extrusion head and are considerably spaced apart from one another. The head must be capable of being rapidly cleaned and insert members provided therein to form flow channels must be readily changeable when it is desired to produce a differently shaped profile.

SUMMARY OF THE INVENTION

According to the present invention, there is provided an extrusion head for producing flat profiles from different rubber or plastics material mixtures, the head including flow channels communicatable with worm or screw extrusion devices, the head comprising a central portion is fixedly connected to a worm or screw extrusion device and upper and lower portions which are pivotably connected thereto, the flow channels being defined by interchangeable insert members which are centrally and axially divided in a longitudinal direction, wherein insert members defining the flow channels are integrally formed, the upper and/or lower surfaces of such inserts defining flow channels, the flow channels being bounded in an upward or downward direction along their length by plane surfaces of the pivotable upper or lower portion or of the stationary central portion, the longitudinally extending axes of symmetry of the flow channels being disposed one above the other in a common, vertical plane.

Because the insert members used in such an arrangement are detachably retained in locking means, and complete flow channels (with the exception of the upper or lower boundaries thereof) are formed in such insert members, one or two new flow channels can be produced simply by replacing one insert member. The replacement operation, necessary when a differently shaped profile is to be produced, is therefore considerably facilitated and can be performed more rapidly.

Because the upper or lower boundaries of the flow channels, which extend longitudinally through the insert members, are covered by the respective sealing faces of either the pivotable upper or lower portions of the extrusion head or by the stationary central portion of the head, the construction of the head itself is simplified. The pivotable upper and lower portions, as well as the stationary central portion, additionally fulfil a sealing and covering effect for the flow channels.

However, it must be particularly emphasized that symmetrical flow path lengths are achived in the channels because all of the flow channels in the extrusion head are disposed one above the other so that their respective longitudinal axes of symmetry are disposed in a common vertical plane. This is achieved despite the fact that three or more flow channels are provided in the head.

To permit an extrusion head for producing tread strips to operate satisfactorily, it is vitally important for all of the flow channels to have virtually the same length. Only when this is ensured, as is the case in the arrangement of the present invention, can a tread strip extrusion head cope in fact with three or more different mixtures.

BRIEF DESCRIPTION OF THE DRAWINGS

Certain embodiments of the present invention will be further described by way of example, with reference to the accompanying drawings, in which:

FIG. 3 is a schematic plan view of the extrusion head shown in FIG. 1;

FIG. 4a is a sectional view taken along the line V—V of FIG. 1 showing a detail of the extrusion head;

FIG. 4b is a sectional view taken along the line IV—IV of FIG. 1 through an extruded tread strip formed by the head shown in FIGS. 1 and 4a;

FIG. 5 is a sectional view through an alternative form of the detail shown in FIG. 4a, again taken along a line corresponding to the line V—V of FIG. 1;

FIG. 6 is an underneath plan view of an insert member forming part of the extrusion head shown in FIG. 1.

FIG. 7 is a cross-sectional view taken along the line VII—VII of FIG. 8; and

FIG. 8 is a plan view of an insert member.

DESCRIPTION OF PREFERRED EMBODIMENTS

Figure 1:
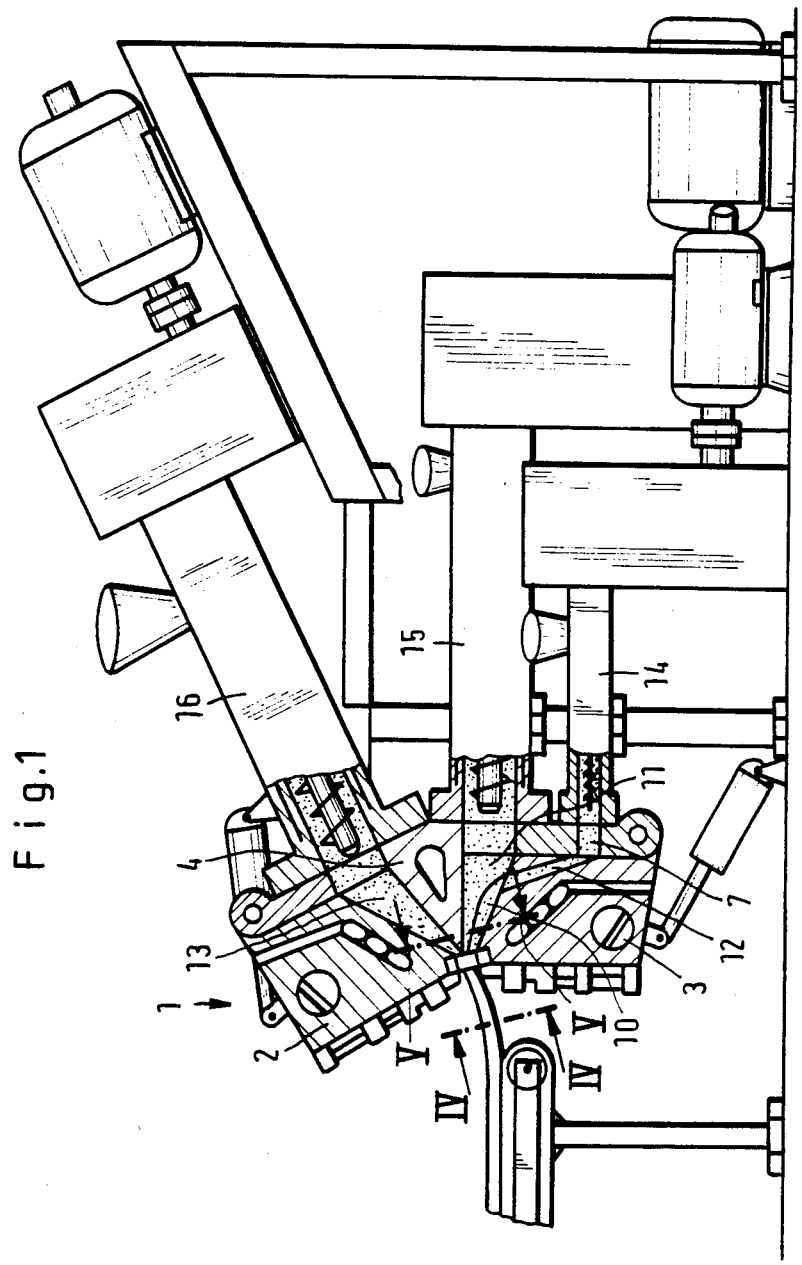
FIG. 1 is a schematic, longitudinal sectional view through a first embodiment of an extrusion head in accordance with the present invention in its closed position.

In FIG. 1, there is shown an extrusion head 1 which comprises extrusion devices 14, 15 and 16. The devices 14, 15 and 16 are disposed generally above one another and are flange-mounted on the extrusion head 1.

The head 1 comprises an upper portion 2, a lower portion 3 and a stationary central portion 4. The portions 2 and 3 are pivotable away from the stationary portion 4 by means of hydraulic cylinders. When the head is in its closed position, as is shown in FIG. 1, the upper portion 2 and lower portion 3 are held together by means of a hydraulic locking device (not shown).

Figure 2:
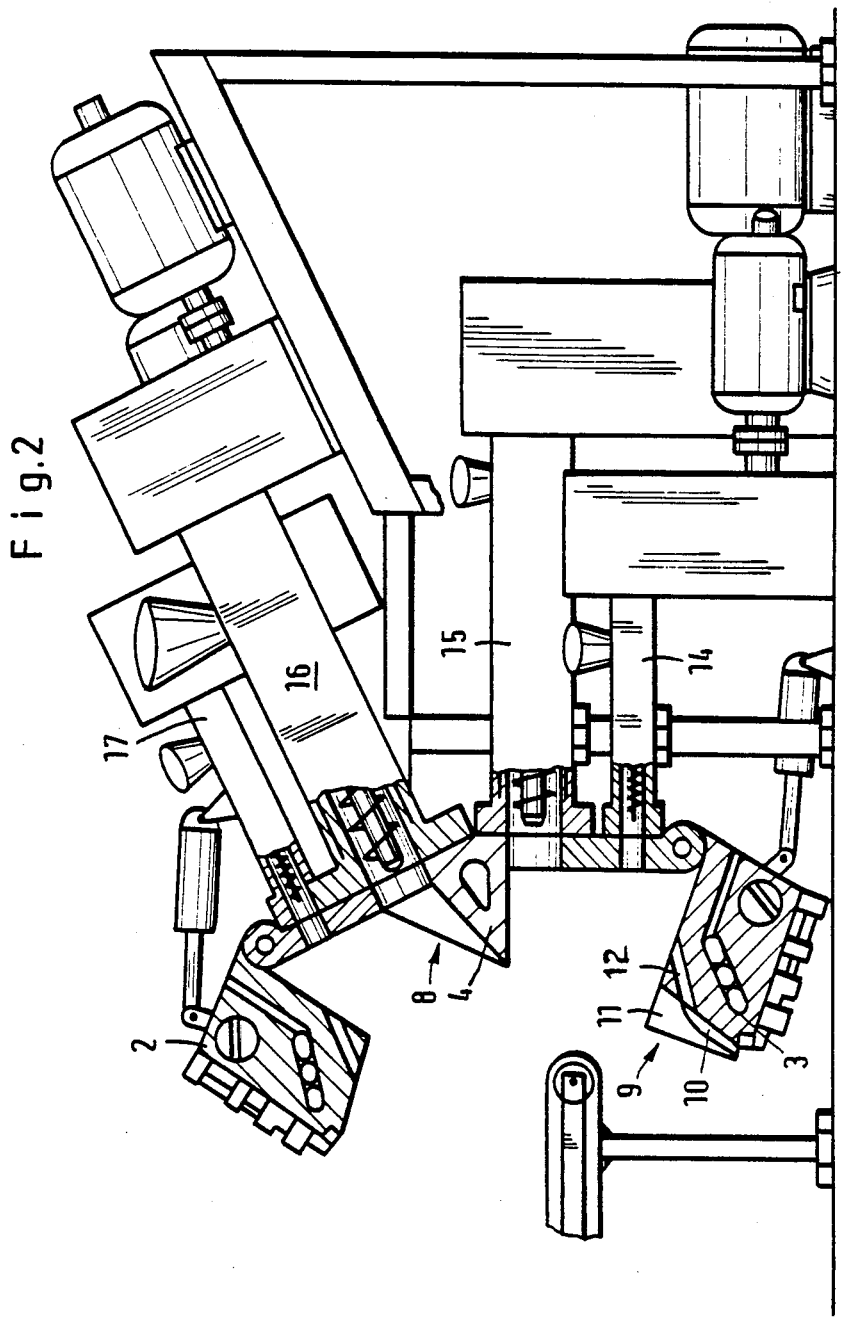
FIG. 2 is a longitudinal sectional view through a second embodiment of an extrusion head in accordance with the present invention in its open position.

FIG. 2 illustrates a second embodiment of an extrusion head in accordance with the present invention. There are many similarities between the heads shown in FIGS. 1 and 2 but two major points of difference are that the head shown in FIG. 2 is in its open position and that four extrusion devices 14, 15, 16 and 17 are provided rather than three as in FIG. 1.

Insert members 8 and 9 are provided in the extrusion devices in both embodiments but are only visible in FIG. 2. These insert members 8 and 9 are shown in greater detail in FIGS. 5 to 8.

As illustrated in FIG. 1 but more clearly in FIG. 5, a flow channel 13 without a parting plane is provided in one face of the insert member 8, which flow channel 13 is supplied with material by the device 16. The lower surface 19 of the upper portion 2 of the head 1 defines the upper surface of the channel 13 when the head 1 is in its closed position.

As can also be seen in FIG. 4a and 5, both the upper and lower surfaces of the insert member 9 are provided with flow channels 10 and 11. The insert members 8 and 9 are both retained or held in the extrusion head 1 by locking devices (not shown).

The insert member 9, shown in FIGS. 5 to 8 is provided with a lower flow channel 10 which is supplied with material by the extrusion device 14 through a connecting channel 7.

The channel 7, visible in FIG. 1, extends from the outlet aperture 12 of the extrusion device 14 and widens out to the width of the flow channel 10, as can be seen in FIG. 6. The lower boundary of the flow channel 10 is defined by the plane surface 21 of the lower portion 3 of the head 1 in the arrangement shown in FIG. 5. In the arrangement shown in FIG. 4a, the upper boundary of the flow channel 10 is defined by the plane surface 20 of the central portion 4.

The flow channel 11, as can best be seen in FIG. 8, is bifurcated to form two separate channels and is used for the extrusion of the lateral rubber portions. The upper boundary of the flow channel 11 is limited by the plane surface 20 of the central portion 4 in the FIG. 5 embodiment and the lower boundary of such channel is defined by the plane surface 21 of the lower portion 3 in the FIG. 4a embodiment.

It may, on occasions, be desired to replace the insert members 8 and/or 9 if, for example, a differently shaped profile is to be produced. Alternatively, it may be desired to remove and clean the members 8 and/or 9 if, for example, the mixture supplied to the head 1 is being changed. This is effected in a simple manner by pivoting the portions 2 and 3 of the head 1 away from the central portion 4 utilising the hydraulic cylinders. The insert members 8 and/or 9 are detached from their locking devices (not shown) and simply removed. Thereafter, the screw or worms can also be simply extracted from the extrusion devices 14, 15, 16 and, if provided, 17, cleaned and replaced.

The device shown in FIG. 1 can be used to produce a tread strip from three different mixtures. As aforementioned, a tread strip comprises a tread surface made of a highly wear-resistant material, lateral portions made of highly compressible material and a so-called lower or base portion which forms the bottom layer of the tread surface and is usually formed from a softer mixture than the tread surface. Each of the extrusion devices 14, 15 and 16 illustrated in FIG. 1 is supplied with one of the mixtures. Each mixture is then plasticized and homogenized and extruded through a nozzle (not shown).

Since the longitudinal axes of symmetry of the flow channels 10, 11 and 13 in the head 1 are disposed in a common vertical plane 18, all three mixtures have substantially identical flow rates and hence remain in the extrusion head for substantially identical periods of time.

In the arrangement illustrated in FIG. 2, four extrusion devices are shown, the extrusion devices 15, 16 and 17 being disposed one above the other, whilst the extrusion device 14 is disposed at an angle to the vertical plane containing the other three devices. The extrusion head 4 in the FIG. 1 embodiment may also be angularly off-set in a similar manner and such an arrangement is illustrated in FIG. 3. Despite the fact that, in the FIG. 2 embodiment, four extrusion devices discharge into a single extrusion head, it is still possible for symmetrical flow paths to be maintained in the head and for the flow channels to be disposed in a common vertical plane. Since the insert members 8 and 9 are formed in one piece and may be provided with flow channels in both their upper and lower surfaces, only two insert members are required, even if four extrusion devices are being used. In consequence, it is never necessary to remove or replace more than two insert members.

Moreover, the use of the arrangement illustrated in FIG. 2 permits two tread strips formed from four different mixtures to be produced simultaneously. In such a case, it is necessary for inserts to be used which are formed in such a manner and which permit the tread strips to be extruded alongside one another.

The arrangements illustrated in FIGS. 1 and FIGS. 2 also permit all of the screws or worms to be extracted and cleaned once the head has been pivoted-open and the insert members 8 and 9 have been removed. To achieve this, it is not necessary for the head itself to be dismantled. This is, however, essential in the prior art arrangement such as the arrangement disclosed in U.S. Pat. No. 3,099,359.

We claim:

1. An extrusion head for producing flat profiles from a plurality of rubber or plastics material mixtures comprising:
   (a) a plurality of worm or screw extrusion devices, each said extrusion device supplying and feeding one of said mixtures;
   (b) an extrusion head located downstream of said plurality of extrusion devices and receiving said mixtures supplied and fed by said device, said head having upper, central and lower portions, said central portion being fixedly mounted and said upper and said lower portions of said head each being pivotally movable relative to said central portion, each of said central, upper and lower portions having at least one plane surface;
   (c) a first interchangeable insert member located between said upper portion and said central portion of said head;
   (d) a second interchangeable insert member located between said central portion and said lower portion of said head;
   (e) said insert members each having upper and lower surfaces, at least one of said upper and lower surfaces of each said insert member defining flow channels for said material supplied and fed to said head by said extrusion devices, each said flow channel being bounded, in an upward or downward direction, by one of said plane surfaces of said upper, central or lower portions of said head; and
   (f) wherein said flow channels each have a longitudinal axis of symmetry, all of which are disposed in a common vertical plane whereby the flow rates of said mixtures can be maintained constant in all of said flow channels.

* * * * *